United States Patent [19]

Richardson

[11] 4,410,555
[45] Oct. 18, 1983

[54] EXPANDED FOOD PRODUCTS
[75] Inventor: Terence W. Richardson, Oakland, Calif.
[73] Assignee: Godiva Chocolatier, Inc., New York, N.Y.
[21] Appl. No.: 306,498
[22] Filed: Sep. 28, 1981
[30] Foreign Application Priority Data Aug. 13, 1981 [WO] PCT Int'l Appl. ........... US81/01082

[51] Int. Cl.$^3$ .............................................. A23G 9/00
[52] U.S. Cl. .................................... 426/572; 426/660
[58] Field of Search ............... 426/572, 660, 103, 571

[56] References Cited

U.S. PATENT DOCUMENTS

| | | | |
|---|---|---|---|
| 2,082,312 | 6/1937 | Todd | 426/103 |
| 2,162,585 | 6/1939 | Musher | 426/564 |
| 2,171,244 | 8/1939 | Otterbacher | 426/572 |
| 2,645,580 | 7/1953 | Schultz | 426/660 |
| 2,847,311 | 8/1958 | Doumak et al. | 426/571 |
| 3,542,270 | 11/1970 | Schubiger | 426/572 |
| 3,556,812 | 1/1971 | Krohn et al. | 426/571 |
| 3,607,309 | 9/1971 | Olney | 426/571 |
| 4,038,423 | 7/1977 | Hayward | 426/103 |
| 4,045,583 | 8/1977 | Jeffery et al. | 426/103 |
| 4,049,832 | 9/1977 | Hayward | 426/103 |
| 4,272,558 | 6/1981 | Bouette | 426/572 |

FOREIGN PATENT DOCUMENTS 566718  11/1958  Canada ............................... 426/103

*Primary Examiner*—Jeanette M. Hunter
*Attorney, Agent, or Firm*—Schuyler, Banner, Birch, McKie & Beckett

[57] ABSTRACT

An expanded food product possessing unique structural and taste properties is provided. This expanded product is a mixture of separately aerated components—one fat-based and one aqueous sugar syrup-based. The resulting expanded product has a density of from about 0.2 to 1.0 g/cm$^3$ and comprises about 15% to about 40% by weight of an edible fat component, about 20% to about 60% by weight of a sugar component, about 6 to 20% by weight of water and about 0.1% to about 10% by weight of a colloid. A preferred product is a stable, homogenous blend of a soft whipped chocolate mass and a whipped marshmallow-like low-cooked sugar syrup.

5 Claims, 1 Drawing Figure

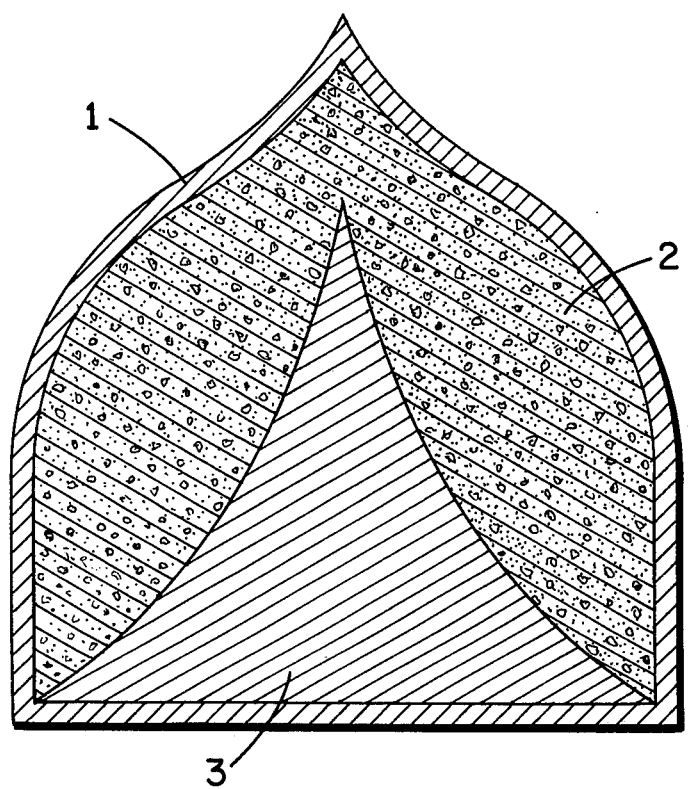

4,410,555

EXPANDED FOOD PRODUCTS

TECHNICAL FIELD

The present invention relates to stable expanded food products exhibiting highly desirable taste and mouth feel properties. More particularly, this invention relates, in its preferred form, to an aerated confectionary product containing both an aqueous and a fatty phase, particularly suited for incorporation into the center of chocolates, candies, candy bars and similar products.

BACKGROUND OF THE INVENTION

Expanded confectionary products including marshmallow type products and aerated chocolate products have been widely utilized in the food industry. See, e.g., Olney U.S. Pat. No. 3,607,309; Musher U.S. Pat. No. 2,162,585; Bouette U.S. Pat. No. 4,272,558; and Shultz U.S. Pat. No. 2,645,580, all incorporated herein by reference. Marshmallow products are based on aqueous sugar syrups whereas the chocolate products are usually based on non-aqueous fat systems. While the prior art has described various attempts to produce combinations or emulsions of these two types of systems, see, e.g., Jeffrey et al U.S. Pat. No. 4,045,583; Krohn et al U.S. Pat. No. 3,556,812; Hayward et al U.S. Pat. No. 4,049,832 and Otterbacher U.S. Pat. No. 2,171,244; the prior art methods involve complicated and delicate processing steps and generally require the use of emulsifiers to produce a stable product.

SUMMARY OF THE INVENTION

It is, therefore, an object of the present invention to provide a process for producing a stable expanded fat/sugar system which is simple and economical and which can be effected without the use of emulsifying agents.

Another object of the present invention is to provide a stable whipped product based on a marshmallow type aqueous component and a chocolate type fatty component, which product exhibits unique textural and taste properties.

It is also an object of the present invention to provide a food product having incorporated therein a composite material which imparts enhanced flavor and textural characteristics to the product, said composite material having as one part thereof a novel expanded fat/sugar system.

Another object of this invention is to provide a chocolate confection exhibiting improved flavor and textural characteristics containing a composite center comprising as one part thereof an expanded chocolate/marshmallow system and having associated therewith an intensely flavored dense core, said composite center having an outer chocolate coating.

These and other objects of the invention, which will readily occur to those skilled in the art, are achieved by providing a process for making a stable expanded homogeneous product comprising a sugar component and a fat component comprising at least one fat which is solid at room temperature, the process comprising the steps of:

(a) providing a low-cooked sugar syrup;
(b) forming a stable whipped aerated material from the sugar syrup;
(c) separately forming a stable whipped aerated material from a fat component having sufficient plasticity to whip but sufficient room temperature crystallinity to give the product body; and
(d) mixing together the stable aerated material of steps (b) and (c) to form an homogenous stable expanded product.

The present invention also provides a stable expanded homogenous product having a density of from about 0.2 g/cm$^3$ to 1.0 g/cm$^3$ and comprising from about 15% to about 40% by weight of an edible fat component, the fat component comprising at least one fat which is solid at room temperature, from about 20% to about 60% by weight of a sugar component, from about 6% to about 20% by weight of water and from about 0.1% to about 10% by weight of a colloid.

In one preferred product according to this invention the fat component is a plasticized chocolate and the sugar component is a marshmallow type mixture. This product is particularly useful as the whipped coating layer of a composite food material suitable for incorporation into a food product as a center or filling therefor. In the preferred form, this composite confectionary product can comprise a rich creamy chocolate core of high density and flavor intensity, which core is coated, using coextrusion techniques, with a light aerated jacket of a whipped chocolate/sugar product having a relatively low flavor intensity when compared to the core material. This unique structural arrangement permits the preparation of a product exhibiting unusually pleasing mouth feel properties after enrobing this composite center in conventional fashion with an outer chocolate coating. The resulting product exhibits, as a result of this structure, what can be likened to a surprise flavor bonus inside what the consumer will at first perceive as a chocolate-coated aerated product. The pronounced differences in flavor intensity and density of the two layers in this composite material serve to ensure that the consumer will be able to distinguish by mouth feel characteristics between these two materials.

BRIEF DESCRIPTION OF THE DRAWING

The FIGURE illustrates one preferred form of a confection product utilizing the expanded product of the present invention.

DETAILED DESCRIPTION OF THE INVENTION

The present invention relates to an expanded fat/sugar material which has unique structural and taste properties. This material may be utilized alone as a food product, e.g., as a dessert, or it can be incorporated as an ingredient, filling or center of a composite food product such as candies, cookies, snack cakes, ice creams and other frozen desserts and the like.

The major components of the expanded product of the present invention are (1) a fat component, (2) a sugar component, (3) a colloid and (4) water. In general, the components can be present in the following amounts (by weight):

| fat component | 15–40% |
| sugar component | 20–60% |
| colloid | 0.1–10% |
| water | 6–20% |

Preferred are products containing the following amounts (by weight):

| | |
|---|---|
| fat component | 20-35% |
| sugar component | 30-40% |
| colloid | 0.1-5% |
| water | 10-15% |

Additional ingredients which optionally can be included in the product of this invention include whipping agents such as egg or soy albumins, lactalbumins and the like; and emulsifying agents. In some cases mechanical action alone can promote sufficient aeration to obviate the need for whipping agents. If desired, these components can be utilized at additive levels normally employed, i.e., typically less than 10% by weight and preferably less than about 5% by weight.

The fat component can comprise any edible fat or mixture of fats and/or oils which is plastic enough to whip and which will have sufficient crystallinity at room temperature to give the product set or body. One of the preferred fat systems is based on cocoa butter, e.g., chocolate. In this system it is often necessary to employ lower melting fats and/or oils to plasticize the chocolate system. Numerous other plant and animal fat systems can also be utilized according to the present invention, but further discussion herein will relate, for convenience, primarily to chocolate systems.

The sugar component of the product of the present invention preferably is a low-cooked sugar syrup comprising mono- and/or disaccharides. Typically, mixtures of sucrose and corn syrup provide the best systems although either or both of these can be replaced in whole or in part by other sugars such as invert sugar and the like. Sucrose acts to impart sweetness to the composition and further effects the body and flow characteristics of the sugar syrup. Dextrose (from the corn syrup) serves to increase the solids content of the syrup and controls sucrose crystallization in a known manner. Corn syrup of any suitable dextrose equivalent (D.E.) normally used to make sugar syrup can be employed in the practice of this invention. By "low-cooked" applicant intends that the sugar syrup be heated to temperatures up to no more than about 240° F. Sugar syrups which can be satisfactorily utilized include the types normally used to prepare marshmallows and similar confectionary products, see, e.g., Otterbacher U.S. Pat. No. 2,171,244; Hayward U.S. Pat. No. 4,049,832; Olney U.S. Pat. No. 3,607,309; and Doumak U.S. Pat. No. 2,847,311, all incorporated herein by reference.

The colloid component is present primarily to ensure the stability of the whipped sugar syrup as described below. Among the suitable colloids useful in this invention are gums such as arabic, guar, locust-bean, carrageenan, xanthan, tragacanth, methylcelluloses and the like; agar; alginates; pectins; starches; dextrine; and gelatins (varieties that are non-setting). Colloids such as settable gelatin are not required in this preferred formulation since the room temperature body of the mixture is contributed by the fat crystallinity. As indicated above, fat systems based on materials other than cocoa butter can be employed if compatible with the remainder of the system, and as long as this fat system has sufficient room temperature crystallinity to give the product requisite body.

One preferred fat/sugar material of the present invention has a density of about 0.68 g/cm³ and the following composition (parts by weight):

| | |
|---|---|
| dark chocolate | 32.5 |
| plasticizing fat/oil | 17.5 |
| sucrose | 23.0 |
| corn syrup solids (62 D.E.) | 9.0 |
| moisture | 12.6 |
| gum arabic | 3.5 |
| egg albumin | 1.0 |
| emulsifier | 0.15 |
| vanilla essence | 0.75 |

The process of making the fat/sugar expanded product of the present invention will now be described. In general, the procedure comprises separately preparing and aerating a low-cooked sugar syrup and a plasticized fat component, and then gently and quickly mixing these materials together to form a homogenous product still containing a major portion of the air introduced into each product. By following this procedure, the need for emulsifying agents can be obviated. It may still be desirable in some cases to include an emulsifying agent in one of the two components (preferably the fat component) to facilitate blending of the two aerated products. Any of a wide variety of commonly used food grade emulsifiers can be utilized for this purpose. In general, a suitable emulsifier will have an hydrophilic-/lipophilic balance (HLB) value of from about 2 to 8. One example of such an emulsifying agent is Atmul 124 which is a mono and diglyceride emulsifier sold by Atlas Chemical Industries of Wilmington, Del.

The process of making each whipped component will now be described. The first step of the process of making the fat component involves melting the solid components of the fat system, e.g., chocolate along with plasticizing fats or oils if necessary. This molten fat system is then cooled to a temperature of about 75° to 140° F. and preferably about 95° to 110° F. The cooled fat is then pumped through any suitable whipping apparatus in which air, nitrogen or the like is injected into the mass after being whipped. The fat system should be whipped to a density of from about 0.4 to 1.0 g/cm³ and preferably to about 0.5 to about 0.8 g/cm³. One suitable piece of equipment for accomplishing this step is the Votator ®CR Mixer Model No. 81-085V available from Chemetron Corp. of Louisville, Ky. The resulting air (or gas) containing product is then pumped through a scraped surface heat exchanger to cool the product preferably to about 65° F.

The sugar syrup portion is also separately formulated and whipped. In the preferred manner of preparing this component of the mixture, sugar, corn syrup (62 D.E.) and water are boiled at a temperature of about 224° to 250° F. and preferably at about 230° to 240° F. After optionally cooling to about 98° to 205° F., a suitable colloid and, if necessary, a whipping agent (both described above) are added to the low-cooked sugar solution. This product is preferably subjected to beating as the syrup portion is being added. Beating is continued until the product exhibits a density of from about 0.2 to 0.8 g/cm³ and preferably 0.3 to 0.5 g/cm³. Any additional flavoring materials, such as vanilla essence, can be added after the beating step.

The final step in the process for making the fat/sugar mixture comprises carefully blending the two whipped aerated products. The relative amounts of aerated fat and aerated sugar syrup employed will of course vary widely with the product objects but should be chosen to give a material having the composition generally set out above. The blending should take place with both components of the mixture at a temperature of from about 70° to 115° F. and preferably about 80° to 90° F. In practice, the components are optimally combined as soon as possible after their separate formation, although this is not required in all cases. The blending step should be effected in a mixer designed to impart very low shear forces to the product. Too much shear will result in losing the air (gas) in the expanded products being mixed. Equipment that affects a gentle folding of the components into a mixture is preferred. In order to further minimize air losses during blending, this step should be carried out as rapidly as possible on the "gentle" equipment. Typically, times of less than about 1 minute and preferably less than 30 seconds should be employed. In any event, the blending should be accomplished in the shortest amount of time and with the least amount of shear necessary to effect a complete mixing (i.e., produce a relatively homogenous mixture).

In general, the above-described whipped fat/sugar mixture exhibits novel structural and mouth feel properties which make it particularly suitable for use in the composite center of a chocolate product of the type described and claimed in commonly assigned copending application Ser. No. 306,497, entitled "Composite Food Products", filed on even date herewith and hereby incorporated by reference. The mixture has a soft light aerated creamy structure which is neither cloying and sticky like a marshmallow nor rich and fatty like a whipped chocolate.

For purposes of illustration only, this invention now will be described with regard to a preferred product form, viz, a chocolate coated confection containing as a center a composite material including the expanded material of this invention. From this description, the nature of similar products containing the expanded material of this invention and the manner of preparing these products will become readily apparent.

One embodiment of this preferred product form is illustrated in the FIGURE. This product comprises two basic components: an outer coating 1 and a composite center which includes intermediate layer 2 and core 3. Each of these materials will first be described separately.

Coating 1 can comprise any of the many outer jacket materials conventionally utilized in the preparation of coated candy products. Typically, these materials include various chocolate types, such as dutch chocolate, milk chocolate, white chocolate and the like as well as chocolate-type materials based on fats other than cocoa butter.

As indicated, the center of the illustrated product comprises a composite material consisting of core 3 and intermediate coating layer 2. It is important for full appreciation of the present invention to understand how the mouth feel characteristics of the overall product are affected by the particular structure and properties of this composite center. The anatomy and physiology of the human mouth permits the consumer of comestible materials to distinguish between differences in both flavor and texture during the biting and/or chewing processes. The manner in which a particular food product responds to these processes is generally referred to as the "mouth feel" of the product. Upon eating products containing one or more discrete areas of the composite material according to the present invention (e.g., the chocolate coated center of the illustrated embodiment), the consumer experiences a surprising and pleasing change in texture and flavor as he or she penetrates the light aerated portion and bites into the more dense and intensely flavored core.

From the foregoing discussion it will be appreciated that the selection of materials for each of the layers in the composite center can vary widely as long as the relative taste and texture properties of these materials are chosen to satisfy the objective outlined above. In addition, it is of course necessary to employ materials for the core and intermediate layer which are, or can be rendered, compatible and stable in contiguous relationship in the desired final product.

The core material is a dense semiplastic mass with a high level of flavor components. In the preferred embodiment, the core is also provided with a smooth creamy texture. Formulations of this nature presently employed in the candy industry may be utilized as the core material of the present invention. Typically, these compositions will contain sugar and/or corn syrup, and milk products (e.g., cream and/or milk solids) and a primary flavoring material. Among the widely used primary flavoring materials are chocolate, peanut butter, coffee and vanilla. Additional flavor additives based on fruit products and the like may also be employed. One preferred formulation based on chocolate flavoring contains sugar, corn syrup, invert sugar, heavy cream, sweetened condensed milk and tempered dark chocolate.

The core material should have a density in the range of from about 1.0 to 1.25 $g/cm^3$. Preferred are core materials having a density of from about 1.1 to 1.2 $g/cm^3$. The term "semiplastic" is intended to refer to the room temperature flow properties of the core mass. This term encompasses formulations which have liquid product viscosities of from about 3,525 to 16,800 centipoise and preferably about 7,000 to 9,000 centipoise (at 100° F.). The core material can be prepared using conventional techniques as demonstrated in the examples.

The intermediate coating layer of the composite should be the light aerated fat/sugar composition described above which has relatively less intense flavor characteristics than that of the core material. The term "aerated" is intended to refer to products which have an expanded structure due to the presence of discrete cells containing air or other gaseous materials.

Having described the preparation of the various materials which make up the composite food product of the present invention, one embodiment of the process of actually forming this composite will now be described.

In the preferred form of the composite (i.e., a dense core coated with an aerated fat/sugar mixture), the final fabrication step is preferably accomplished by known coextrusion techniques. This step can be performed on, for example, an OKA-Duplex-Depositor made by Otto Kremling Spezialmaschinenfabrik GmbH, Darmstadt, West Germany. In general, this type of equipment is provided with two separate product hopper and delivery systems which feed a single extrusion die. Care must be taken in both the product delivery and extrusion steps to avoid excessive working which causes the aerated fat/sugar mixture to lose air. After forming the co-extrudate, and cooling, this product can be fed to conventional chocolate enrobing equipment or otherwise incorporated into the final desired food product.

The particular dimensions of the composite material and relative proportions of dense core to aerated coating will of course vary widely depending on the type of final food product into which the composite is introduced. As a general rule, however, the relative thicknesses of the two materials should be such that the desired contrast in mouth feel properties will be significant. Thus, in the preparation of composite centers for use in chocolate candies, the core can vary from about 3 to 20 millimeters in diameter, preferably about 10 millimeters, while the thickness of the aerated coating can range from about 15 to 50 millimeters, preferably about 30 millimeters.

While the above description has been primarily directed to the formation of concentrically coated composites, it may be desirable in some instances to provide this composite in other coextruded or coformed geometries. Any such arrangement can be employed as long as the characteristic contrast in texture and taste properties can be perceived by the consumer. Accordingly, the two components can be codeposited in any contiguous fashion such as side-by-side or in layers. It is also contemplated that more than two distinct materials of contrasting properties may be combined geometrically to achieve the enhanced mouth feel properties of this invention.

The following examples are intended to illustrate more fully the nature of the present invention without acting as a limitation on its scope.

EXAMPLE 1

This example demonstrates the preparation of a whipped fat/sugar amalgam according to the present invention. The following ingredients were combined together and boiled to 235° F.

| | |
|---|---|
| sugar | 12.2 lbs. |
| corn syrup (62 D.E.) | 5.9 lbs |
| water | 1.5 liter |

This mixture was then cooled to 170° F. In a separate step the following were combined in a Blakeslee mixer equipped with a wire whip:

| | | |
|---|---|---|
| predissolved: | gum arabic | 1.9 lbs. |
| | water | 0.7 liter |
| predissolved: | egg albumin | 8.6 oz. |
| | water | 0.5 liter |

The mixer was then started and the cooled syrup portion was added slowly. Beating of the mixture was continued until a density of about 0.4 g/cm³ was reached. Finally, 0.15 liter of vanilla essence was mixed into this product.

In a separate preparation step 17.5 lbs. of tempered dark chocolate (Guittard's French Vanilla) was melted to 120° F. and combined (with mixing) with the following:

| | |
|---|---|
| Durkex 500 | 4.7 lbs. |
| (An oil available from Durkee and having a melting point of about 72° F.) | |
| Cirol | 4.7 lbs. |
| (An oil available from Durkee and having a melting point of about 91° F.) | |
| Atmul 124 | 1.3 oz. |

The mixture was cooled to about 69° F. and beat for about 5 minutes to a density of about 0.65 g/cm³. The temperature of this product was about 70° F.

In the final step of this procedure the whipped fat and syrup portions were combined by gentle folding over about 20–30 seconds. This combination took place at about 80°–90° F. and resulted in a product having a density of about 0.68 g/cm³. The product has a soft light aerated creamy structure which is neither cloying and sticky like a marshmallow nor rich and fatty like an aerated soft chocolate.

EXAMPLE 2

This example demonstrates the preparation of a core composition suitable for use in producing a composite food product utilizing the expanded jacket material of the present invention. The following ingredients, in the amounts shown, were combined with stirring, heated to 222° F. and cooled to 80° F.:

| | |
|---|---|
| heavy cream | 24 lbs. |
| sugar (medium fine) | 37.5 lbs. |
| corn syrup (42 D.E.) | 13.3 lbs. |
| invert sugar | 6 lbs. |
| sweetened condensed milk | 19.5 lbs. |
| salt | 2 oz. |
| lecithin | 1 oz. |

Ninety pounds of melted tempered dark chocolate was then added to the above formulation with stirring to achieve a homogeneous product. The resulting product was then cooled to room temperature. This core material has a density of about 1.1 g/cm³, a creamy semifluid room temperature consistency and an intense, rich chocolate flavor.

EXAMPLE 3

This example demonstrates the preparation of a composite food product utilizing the expanded product of the present invention. In this preparation a core material made according to Example 2 is combined with the whipped jacket material made according to Example 1. These two materials are fed to the separate product hoppers of an OKA-Duplex-Depositor which is equipped with extrusion dies suitable for coextruding a product having the shape shown in the FIGURE. In the coextrusion process a creamy dense inner core is formed and this core is then coated with a light whipped jacket. The center thus produced is then enrobed with chocolate in the conventional fashion. The resulting product is a chocolate piece having a composite center which imparts to it the novel and exciting mouth feel characteristics described above.

While certain specific embodiments of the invention have been described with particularity herein, it will be recognized that various modifications thereof will occur to those skilled in the art. Therefore, the scope of the invention is to be limited solely by the scope of the appended claims.

I claim:

1. A process for making a stable expanded homogenous confectionary product having a soft light aerated creamy structure, a density of from about 0.2 to 1.0 g/cm³ and comprising from about 15 to about 40% by weight of an edible fat component, said fat component comprising at least one fat which is solid at room temperature, from about 20 to about 60% by weight of a sugar component, from about 6 to about 20% by weight of water and from about 0.1 to about 10% by weight of a colloid said process comprising the steps of
   (a) providing a low-cooked sugar syrup;

(b) forming a stable whipped aerated material from said sugar syrup;
(c) separately forming a stable whipped aerated material from a fat component having sufficient plasticity to whip but sufficient room temperature crystallinity to give the product body; and
(d) mixing together the stable aerated material of steps (b) and (c) to form an homogenous stable expanded product.

2. The process of claim 1 wherein said fat component comprises a plasticized chocolate material.

3. The process of claim 1 wherein said sugar component is selected from the group consisting of sucrose, dextrose and mixtures thereof.

4. The process of claim 1 wherein said product has a density of from about 0.5 to 0.9 g/cm$^3$.

5. The process of claim 1 wherein said sugar syrup comprises sucrose, dextrose, a colloid and a whipping agent.

* * * * *